United States Patent
Ren et al.

(10) Patent No.: US 11,094,072 B2
(45) Date of Patent: Aug. 17, 2021

(54) SYSTEM AND METHOD FOR PROVIDING SINGLE IMAGE DEPTH ESTIMATION BASED ON DEEP NEURAL NETWORK

(71) Applicant: Samsung Electronics Co., Ltd., Gyeonggi-do (KR)

(72) Inventors: Haoyu Ren, San Diego, CA (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/574,770

(22) Filed: Sep. 18, 2019

(65) Prior Publication Data
US 2020/0327685 A1    Oct. 15, 2020

Related U.S. Application Data

(60) Provisional application No. 62/831,598, filed on Apr. 9, 2019.

(51) Int. Cl.
*G06T 7/50* (2017.01)
*G06N 3/04* (2006.01)
*G06K 9/62* (2006.01)

(52) U.S. Cl.
CPC .............. *G06T 7/50* (2017.01); *G06K 9/6267* (2013.01); *G06N 3/0454* (2013.01); *G06T 2207/10028* (2013.01)

(58) Field of Classification Search
CPC ............ G06T 7/50; G06T 2207/10028; G06N 3/0454; G06K 9/6267
See application file for complete search history.

(56) References Cited

U.S. PATENT DOCUMENTS

| | | | |
|---|---|---|---|
| 9,177,381 B2 | 11/2015 | McKinnon | |
| 10,019,657 B2 | 7/2018 | Lin et al. | |
| 10,255,686 B2 | 4/2019 | Bhardwaj et al. | |
| 2013/0336580 A1* | 12/2013 | Saund | G06K 9/6892 382/159 |
| 2016/0078312 A1* | 3/2016 | Kimura | G06K 9/00624 382/155 |
| 2016/0350930 A1* | 12/2016 | Lin | G06K 9/66 |
| 2017/0053412 A1 | 2/2017 | Shen et al. | |

(Continued)

FOREIGN PATENT DOCUMENTS

EP    2747028    8/2015

OTHER PUBLICATIONS

Eigen, David et al., "Depth Map Prediction from a Single Image using a Multi-Scale Deep Network", eprint arXiv:1406.2283, Jun. 9, 2014, pp. 9.

(Continued)

*Primary Examiner* — Dhaval V Patel
(74) *Attorney, Agent, or Firm* — The Farrell Law Firm, P.C.

(57) ABSTRACT

A method and system for determining depth information of an image are herein provided. According to one embodiment, the method includes receiving an image input, classifying the input image into a depth range of a plurality of depth ranges, and determining a depth map of the image by applying depth estimation based on the depth range into which the input image is classified.

20 Claims, 8 Drawing Sheets

(56) References Cited

U.S. PATENT DOCUMENTS

2018/0315166 A1* 11/2018 Noyes ................ G06T 5/00

OTHER PUBLICATIONS

Zhuo, Wei et al., "Indoor Scene Structure Analysis for Single Image Depth Estimation", 2015 IEEE Conference on Computer Vision and Pattern Recognition (CVPR), . . . May 15, 2015, pp. 9.

Li, Ruibo et al., "Deep attention-based classification network for robust depth prediction", eprint arXiv:1807.03959, Jul. 11, 2018, pp. 17.

Fu, Huan et al., "Deep Ordinal Regression Network for Monocular Depth Estimation", eprint arXiv:1806.02446, Jun. 6, 2018, pp. 10.

Ma, Fangchang et al., "Sparse-to-Sense: Depth Prediction from Sparse Depth Samples and a Single Image", eprint arXiv:1709.07492, Feb. 26, 2018, pp. 8.

Ayan Chakrabarti et al., "Depth from a single image by harmonizing overcomplete local network predictions", Advances in Neural Information Processing Systems, pp. 2658-2666, 2016.

Jia-Ren Chang et al., "Pyramid stereo matching network, Proceedings of the IEEE Conference on Computer Vision and Pattern Recognition," pp. 5410-5418, 2018.

Weifeng Chen et al., "Single image depth perception in the wild", Advances in Neural Information Processing Systems, pp. 730-738, 2016.

Xinjing Cheng et al., "Depth estimation via affinity learned with convolutional spatial propagation network", Proceedings of the European Conference on Computer Vision (ECCV), pp. 103-119, 2018.

Francois Chollet, "Xception: Deep learning with depthwise separable convolutions", Proceedings of the IEEE Conference on Computer Vision and Pattern Recognition, pp. 1251-1258, 2017.

Angela Dai et al., "Scannet: Richly-annotated 3d reconstructions of indoor scenes", Proceedings of the IEEE Conference on Computer Vision and Pattern Recognition, pp. 5828-5839, 2017.

Erick Delage et al., "A dynamic bayesian network model for autonomous 3D reconstruction from a single indoor image", 2006 IEEE Computer Society Conference on Computer Vision and Pattern Recognition, vol. 2, pp. 2418-2428, 2006.

David Eigen et al., "Predicting depth, surface normals and semantic labels with a common multi-scale convolutional architecture", Proceedings of the IEEE International Conference on Computer Vision, pp. 2650-2658, 2015.

David Eigen et al., "Depth map prediction from a single image using a multi-scale deep network", Advances in Neural Information Processing Systems, pp. 2366-2374, 2014.

Huan Fu et al., "Deep ordinal regression network for monocular depth estimation", Proceedings of the IEEE Conference on Computer Vision and Pattern Recognition, pp. 2002-2011, 2018.

Andreas Geiger et al., "Vision meets robotics: The kitti dataset", The International Journal of Robotics Research, 32(11), pp. 1231-1237, 2013.

Derek Hoiem et al., "Automatic Photo Pop-Up", ACM Transactions on Graphics (TOG), 24(3), pp. 577-584, 2005.

Kevin Karsch et al., "Depth transfer: Depth extraction from video using non-parametric sampling", IEEE Transactions on Pattern Analysis and Machine Intelligence, 36(11), pp. 2144-2158, 2014.

Alex Kendall et al., "End-to-end learning of geometry and context for deep stereo regression", ICCV paper, pp. 66-75, 2017.

Yevhen Kuznietsov et al., "Semi-supervised deep learning for monocular depth map prediction", Proc. of the IEEE Conference on Computer Vision and Pattern Recognition, pp. 6647-6655, 2017.

Lubor Ladicky et al., "Pulling things out of perspective", Proceedings of the IEEE Conference on Computer Vision and Pattern Recognition, pp. 89-96, 2014.

Iro Laina et al., "Deeper depth prediction with fully convolutional residual networks", 2016 Fourth International Conference on 3D Vision (EDV), pp. 239-248, 2016.

Bo Li et al., "Monocular depth estimation with hierarchical fusion of dilated cnns and soft-weighted-sum inference", Pattern Recognition, 83, pp. 328-339, 2018.

Jun Li et al., "A two-streamed network for estimating fine-scaled depth maps from single rgb images", Proceedings of the 2017 IEEE International Conference on Computer Vision, pp. 22-29, 2017.

Ruibo Li et al., "Deep attention-based classification network for robust depth prediction", arXiv:1807.03959, pp. 1-17, 2018.

Fangchang Ma et al., "Sparse-to-dense: depth prediction from sparse depth samples and a single image", arXiv:1709.07492, pp. 1-8, 2017.

Olaf Ronneberger et al., "U-net: Convolutional Networks for biomedical image segmentation", International Conference on Medical Image Computing and Computer-Assisted Intervention, pp. 234-241, 2015.

Ashutosh Saxena et al., "3-D depth reconstruction from a single still image", International Journal of Computer Vision, 76(1), pp. 53-69, 2008.

Dan Xu et al., "Multi-scale continuous crfs as sequential deep networks for monocular depth estimation", Proceedings of CVPR, vol. 1, pp. 5354-5362, 2017.

Bolei Zhou et al., "Places: A 10 million image database for scene recognition", IEEE Transactions on Pattern Analysis and Machine Intelligence, pp. 1-14, 2017.

* cited by examiner

SYSTEM AND METHOD FOR PROVIDING SINGLE IMAGE DEPTH ESTIMATION BASED ON DEEP NEURAL NETWORK

PRIORITY

This application is based on and claims priority under 35 U.S.C. § 119(e) to U.S. Provisional Patent Application filed on Apr. 9, 2019 in the United States Patent and Trademark Office and assigned Ser. No. 62/831,598, the entire contents of which are incorporated herein by reference.

FIELD

The present disclosure is generally related to computer vision. In particular, the present disclosure is related to a system and method for providing single image depth estimation based on a deep neural network.

BACKGROUND

Single image depth estimation (SIDE) is a feature for understanding a geometric structure of a scene in an image. In particular, a depth map can be used to infer a three-dimensional (3D) structure, which is the basic element of many topics in 3D vision, such as image reconstruction, image rendering, and shallow depth of the field. However, SIDE is an issue as a single two-dimensional (2D) image may be produced from an infinite number of distinct 3D scenes. By using deep convolutional neural networks (CNNs), deep learning based methods have achieved performance improvement when addressing the SIDE issue such as learning a CNN mapping an image to a continuous depth map.

Estimation of real world depth of elements in a captured scene has applications such as the capability of separating the foreground (close) objects from the background (far) objects. Accurate depth estimation allows separation of the foreground objects of interest from the background in a scene. Accurate foreground-background separation allows one to process the captured images to emulate effects such as the Bokeh effect. Bokeh is the soft out-of-focus blur of the background which is mastered by using the right the settings in cameras with fast lenses and wide apertures, as well as making the cameras closer to the subject and the subject further away from the background to emulate the shallow depth-of-field. Thus, accurate depth estimation allows processing images from non-professional photographers or cameras with smaller lenses (such as mobile phone cameras) to obtain more aesthetically pleasant images with the Bokeh effect which focuses on the subject. Other applications of accurate depth estimation include 3D object reconstruction and virtual reality applications, where it is desired to change the background or the subject and render them according the desired virtual reality. Other applications of accurate depth estimation from the captured scene include car automation, surveillance cameras, self-driving applications, and enhanced safety by improving the object detection accuracy and estimation of its distance from the camera.

There are two issues when designing deep CNNs for SIDE. A SIDE method may train different networks for individual datasets, which makes the models to be specific to certain domains. As a result, the large differences between different datasets such as indoor and outdoor patterns limit the generalization ability of the SIDE network. A model achieving considerable performance on one dataset will perform poorly on the other one.

In addition, existing SIDE networks utilize very deep architecture as a backbone. The size of these networks is very large. Furthermore, some SIDE networks contain fully connected layers. Thus, a sliding-window strategy is required during the prediction to make the testing image size the same as training. As a result, the efficiency and flexibility of such networks are not undesirable.

SUMMARY

According to one embodiment, a method includes receiving an image input, classifying the input image into a depth range of a plurality of depth ranges, and determining a depth map of the image by applying depth estimation based on the depth range into which the input image is classified.

According to one embodiment, a system includes a memory and a processor configured to receive an image input, classify the input image into a depth range of a plurality of depth ranges, and determine a depth map of the image by applying depth estimation based on the depth range into which the input image is classified.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Figure 1:
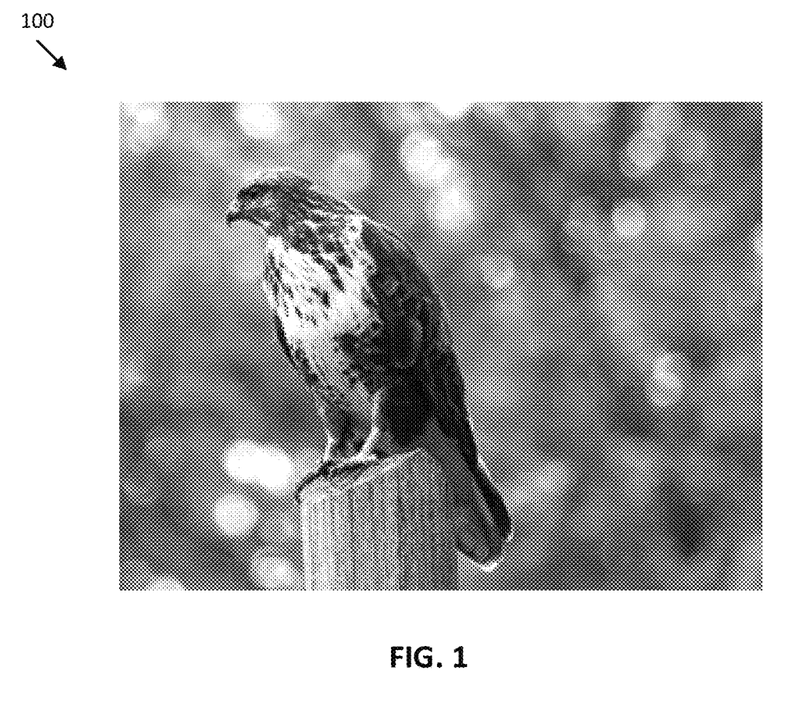
FIG. 1 illustrates a diagram of an image demonstrating the Bokeh effect, according to an embodiment.

FIG. 1 illustrates a diagram of an image demonstrating the Bokeh effect, according to an embodiment. Accurate depth estimation has many applications. An image 100 shows the Bokeh effect. Bokeh is the process of blurring the background subjects in an image by making the far subjects out of focus, while making the closer subjects sharper or in focus. The key feature in image Bokeh is the accurate foreground-background segmentation, which is extracted from the depth map. The performance of Bokeh effect is decided by the accuracy of the estimated depth.

Figure 2:
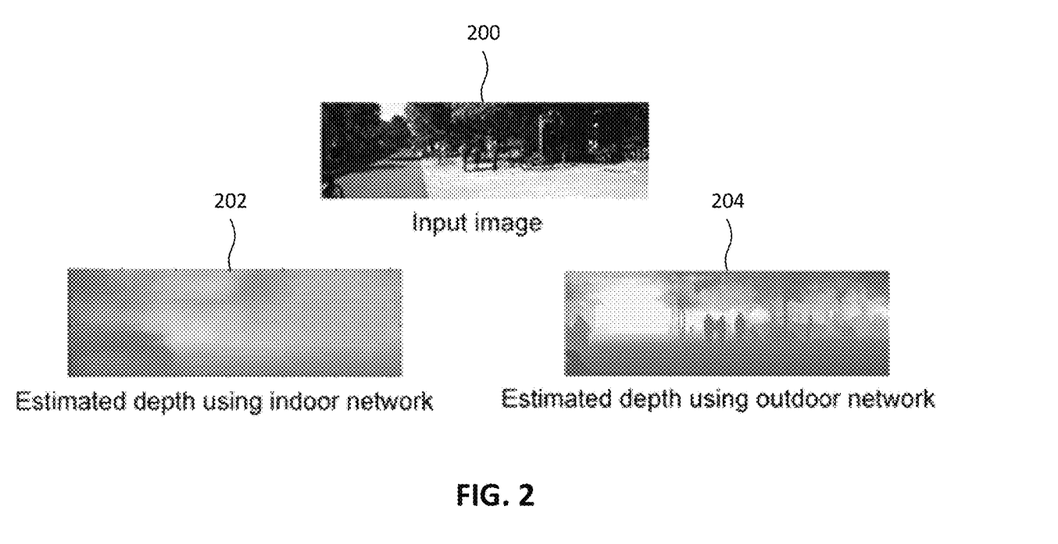
FIG. 2 illustrates a diagram of depth estimation using an indoor network and an outdoor network, according to an embodiment.

FIG. 2 illustrates a diagram of depth estimation using an indoor network and an outdoor network, according to an embodiment. SIDE has issues since a single 2D image may be produced from an infinite number of distinct 3D scenes. Since it is very difficult to obtain an accurate depth map, most of the existing Bokeh systems use multiple cameras instead of single camera. This limits the application scenario. Although some existing SIDE systems can generate considerable results in specific datasets, these systems work poorly when an image from a different dataset is given. For instance, when provided an input image 200 that is of an outdoor scene, a neural network trained in indoor images cannot perform well, as shown by the estimated depth at image 202, versus the estimated depth at image 204 performed by an outdoor network. Thus, it is necessary to design robust SIDE systems, which work well for images in various environment concurrently.

Figure 3:
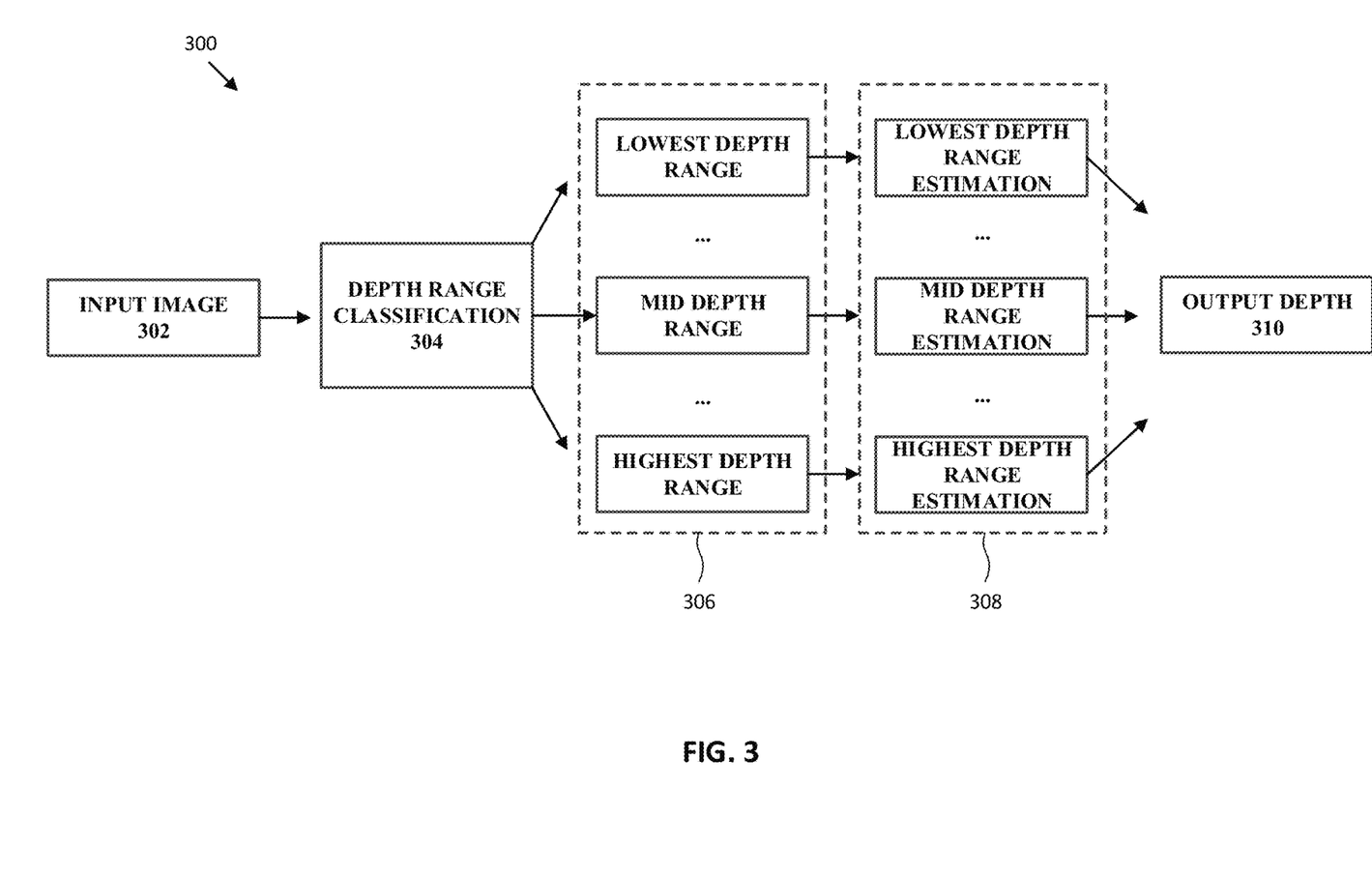
FIG. 3 illustrates a diagram providing depth estimation, according to an embodiment.

FIG. 3 illustrates a diagram providing depth estimation, according to an embodiment. A depth estimation system 300 includes a two-stage robust SIDE framework. At a first stage 304, the depth estimation system 300 classifies an input image 302 into different depth ranges 306 (e.g., the indoor image can be classified as "low depth range"). Although a lowest depth range, a mid depth range and highest depth range are depicted, any number and types of ranges may be utilized. At a second stage 308, for each of the depth-range, the present system applies a SIDE network optimized for the depth range into which the image is classified range to obtain an accurate depth map, and the depth is output 310.

Figure 4:
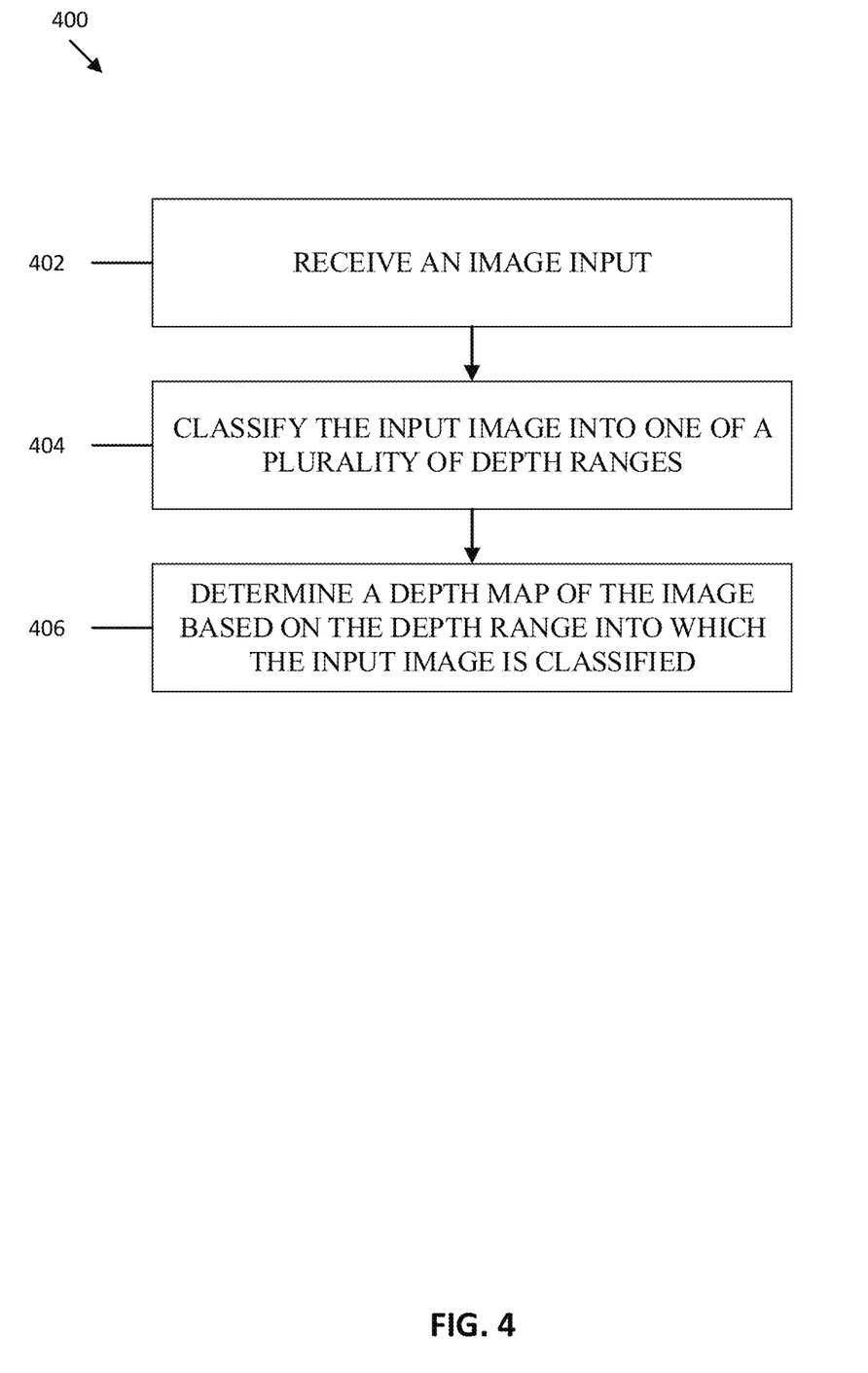
FIG. 4 illustrates a flowchart of a method for performing depth estimation of an image, according to an embodiment.

FIG. 4 illustrates a flowchart 400 of a method for performing depth estimation of an image, according to an embodiment. At 402, the system receives an image input. Although the embodiments described below pertain to receiving an image as an input, it will be understood that the system may receive a portion of an image as an input, and the steps described herein may be performed on portions of the image separately or independently of each other.

At 404, the system classifies the input image into one of a plurality of depth ranges. The system may classify the image into a depth range by classifying the image into a predefined scene (e.g., the sky, an iceberg, a room). Since a scene may have an association with a particular or predefined depth range (e.g., sky has a highest depth range, a room scene has a relatively low depth range), the exact depth range of the input image can be inferred from the scene categories.

The system may classify the image into a predefined scene based on a majority voting algorithm. In one example, a WideResNet-18 is trained in Places-365 dataset. The dataset includes a large number of predefined or labelled scenes or scene categories. The scenes or scene categories are further labelled based on their associated depth range. Given an input image, the system uses a top number of predicted scenes to vote for the depth range classification of the input image. For example, if the system uses the top 15 predicted scenes, the system classifies the image as low depth range if there are more than 7 low depth range votes in the top 15 predicted scenes.

The system may classify the image into a predefined scene based on a weighted voting algorithm. $d_i$ and $m_i$ represent the statistical median and maximum (or X-percentile) depths for scene category i. $p_i$ is the probability that the current scene is classified as the ith scene by the scene classification network. Then the median depth for the current scene can be estimated as in Equation (1):

$$\sum_{i=1}^{n} d_i * p_i \quad (1)$$

and the estimated maximum (or X-percentile) depth for the current scene can be estimated as in Equation (2):

$$\sum_{i=1}^{n} m_i * p_i \quad (2)$$

where the sum is over all candidate scenes. Using the estimated median and maximum (or X-percentile) depth, the system may choose the quantized bin for the depth range by comparing the median or maximum depth of the estimated image to various predefined depth range thresholds.

Alternatively, the system may classify the image into a depth range using coarse depth estimation. Since it is difficult to obtain an accurate estimated depth in a one-shot way, the system may obtain a coarse estimated depth map first, and then use it to decide the depth range. Any SIDE network can be utilized as the coarse depth estimation network. When using coarse estimated depth maps to decide the depth range, the system may refer to some statistics such as maximum depth or minimum depth, because the high depth-range images such as outdoor images will have relatively higher maximum depth.

The system may calculate the statistic of maximum estimated depth using the validation data of indoor and outdoor images (e.g., from Robust Vision Challenge), and then select the threshold of deciding low depth-range/high depth-range (e.g., if the threshold is a depth value X, and the maximum depth of an estimated depth map is lower than X, the system classifies the image as low depth-range).

In a more general way of using the coarse depth estimation to obtain the depth range, the system may construct a map from the coarse depth map to discrete depth ranges. This can be achieved by learning a classifier from the coarse depth maps to depth ranges, as D=F(d), where D is the estimated depth range, d is the coarse depth map, and F is a classifier, such as support vector machine (SVM), Multi-class boosting, and random forest.

At 406, the system determines a depth map of the image based on the depth range into which the input image was classified.

Figure 5:
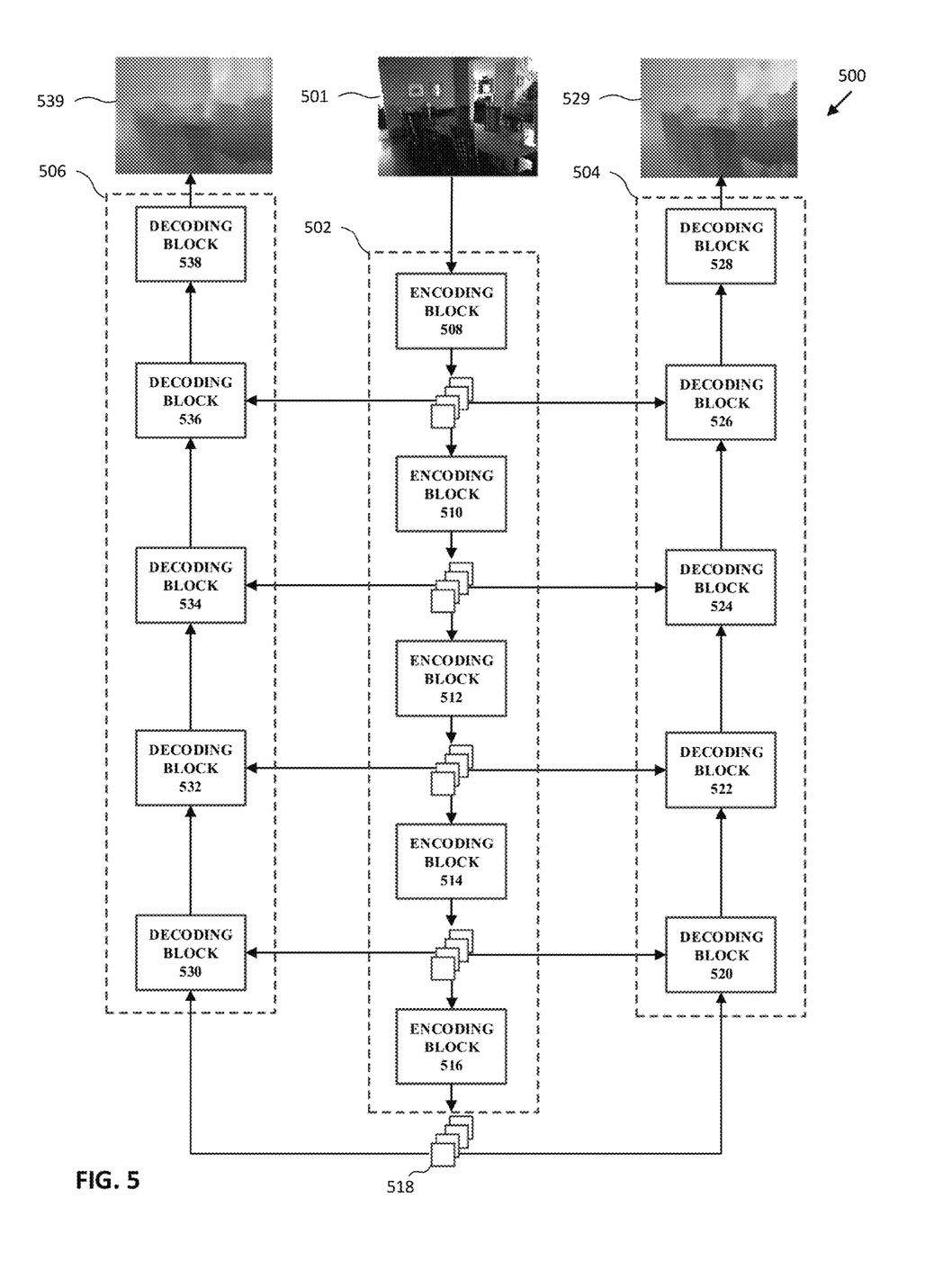
FIG. 5 illustrates a diagram of a SIDE network, according to an embodiment.

FIG. 5 illustrates a diagram of a SIDE network, according to an embodiment. The system utilizes an efficient SIDE network (depth-wise (DW)-SIDENet) based on encoder-decoder architecture. A SIDE network 500 includes an encoding branch 502, a depth classification decoding branch 504 and a depth regression decoding branch 506.

The encoding branch 502 includes an encoding block 508 and several depth-wise separable convolutional layers (e.g., encoding blocks 510, 512, 514 and 516) to extract the discriminative features 518 from the input image 501. Since the low depth-range images have different characteristics with the high depth-range images (e.g., indoor images have different context with outdoor images), the encoding branch 502 of the low depth-range network is slightly different from the high depth-range network. The system may set the output feature map size of the high depth-range encoding module to x4 downsampled, and the low depth-range encoding module to x32 downsampled, for example.

The network decodes using a depth classification branch 504 and a depth regression branch 506. These two branches have mostly same network architecture, but different output feature maps and loss functions. The depth classification decoding branch 504 includes upsampling decoding blocks 520, 522, 524 and 526 which decodes with upproj-con layers with skip connections, and a decoding block 528 that decodes with a upproj layer to output the depth map 529. The depth regression decoding branch 506 includes upsampling decoding blocks 530, 532, 534 and 536 which decodes with upproj-con layers with skip connections, and a decoding block 538 that decodes with a upproj layer to output the depth map 539. In the classification branch 504, the SIDE network 500 performs depth classification after quantizing the continuous depth into several bins. When calculating the loss function of the classification branch 504, the network uses a weighted sum of the quantized depth probabilities and the quantized depth values as the predicted quantized depth for each pixel location. In the regression branch 506, the network directly regresses the output feature maps to a continuous disparity map.

The loss function of DW-SIDENet 500 is a linear combination of the depth value classification loss (Huber), and the depth regression loss and is given as Equation (3):

$$\text{loss} = \sum_i w_1 \times \text{Huber}(d_{i,cls}, d^*_{i,qt}) + w_2 \times L_1(d_{i,reg}, d^*_i); \quad (3)$$

$$\text{Huber}(d, d^*) = \begin{cases} 0.5(d-d^*)^2 & \text{if } |d-d^*|-1 \\ |d-d^*|-0.5 & \text{otherwise} \end{cases}$$

where $d^*_i$ is the ground-truth depth of image i, $d^*_{i,qt}$ is the quantized ground-truth, $d_{i,cls}$ and $d_{i,reg}$ are the outputs from two branches. The depth map 529 is determined by the classification branch 504 and the depth map 539 is determined by the regression branch 506.

Figure 6:
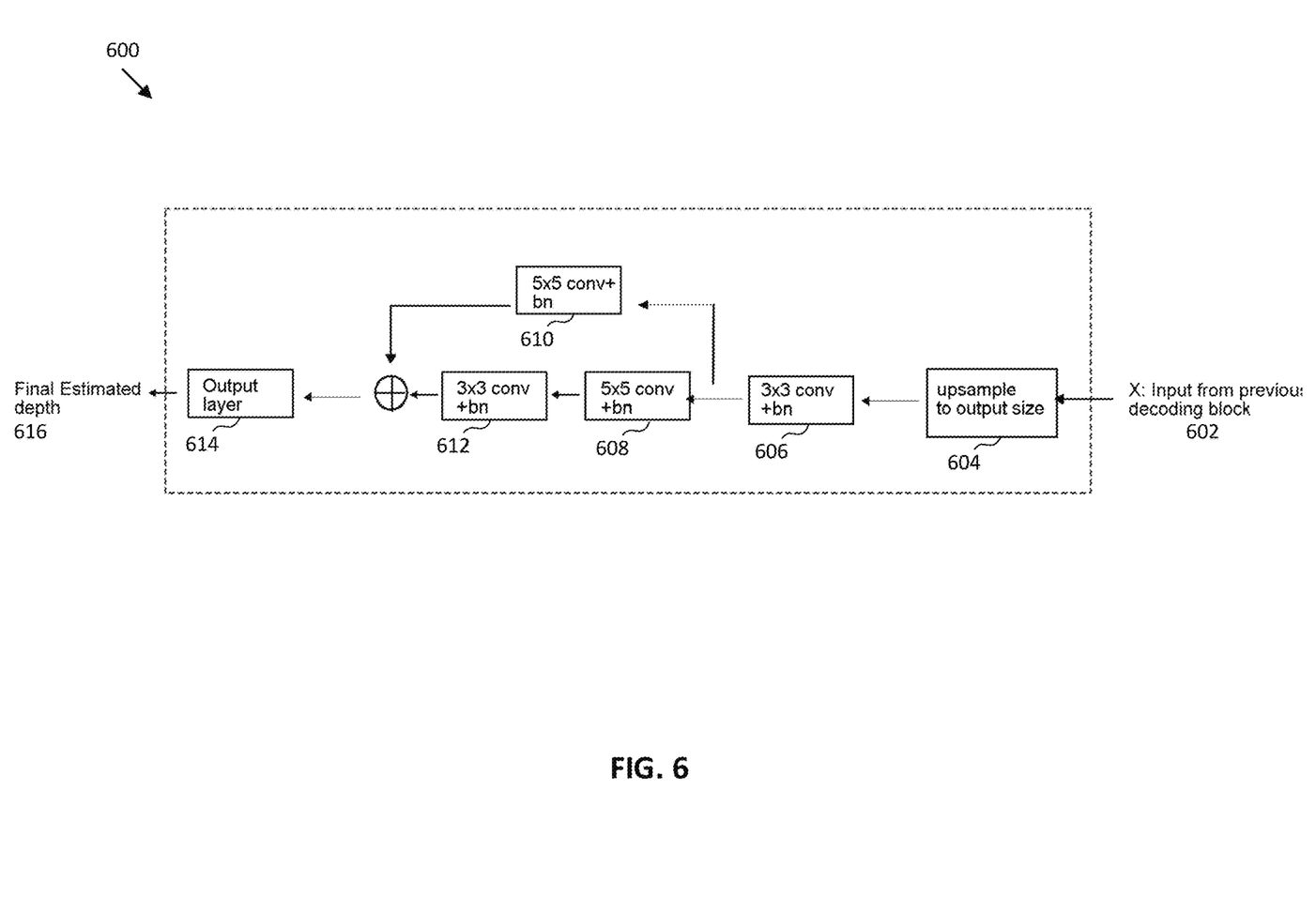
FIG. 6 illustrates a diagram of an upproj layer, according to an embodiment.

FIG. 6 illustrates a diagram of an upproj layer, according to an embodiment. An upproj layer 600 receives the X input 602 from a previous decoding block. The input is upsampled at 604 to output size and then processed through a 3×3 convolutional layer 606. The output of the 3×3 convolutional layer 606 is processed by a first 5×5 convolutional layer 608 and a second 5×5 convolutional layer 610. The output of the first 5×5 convolutional layer 608 is processed by a 3×3 convolutional layer 612, the output of which is combined with the output of the second 5×5 convolutional layer 610. Then, an output layer 614 is produced, giving the final estimated depth 616.

Figure 7:
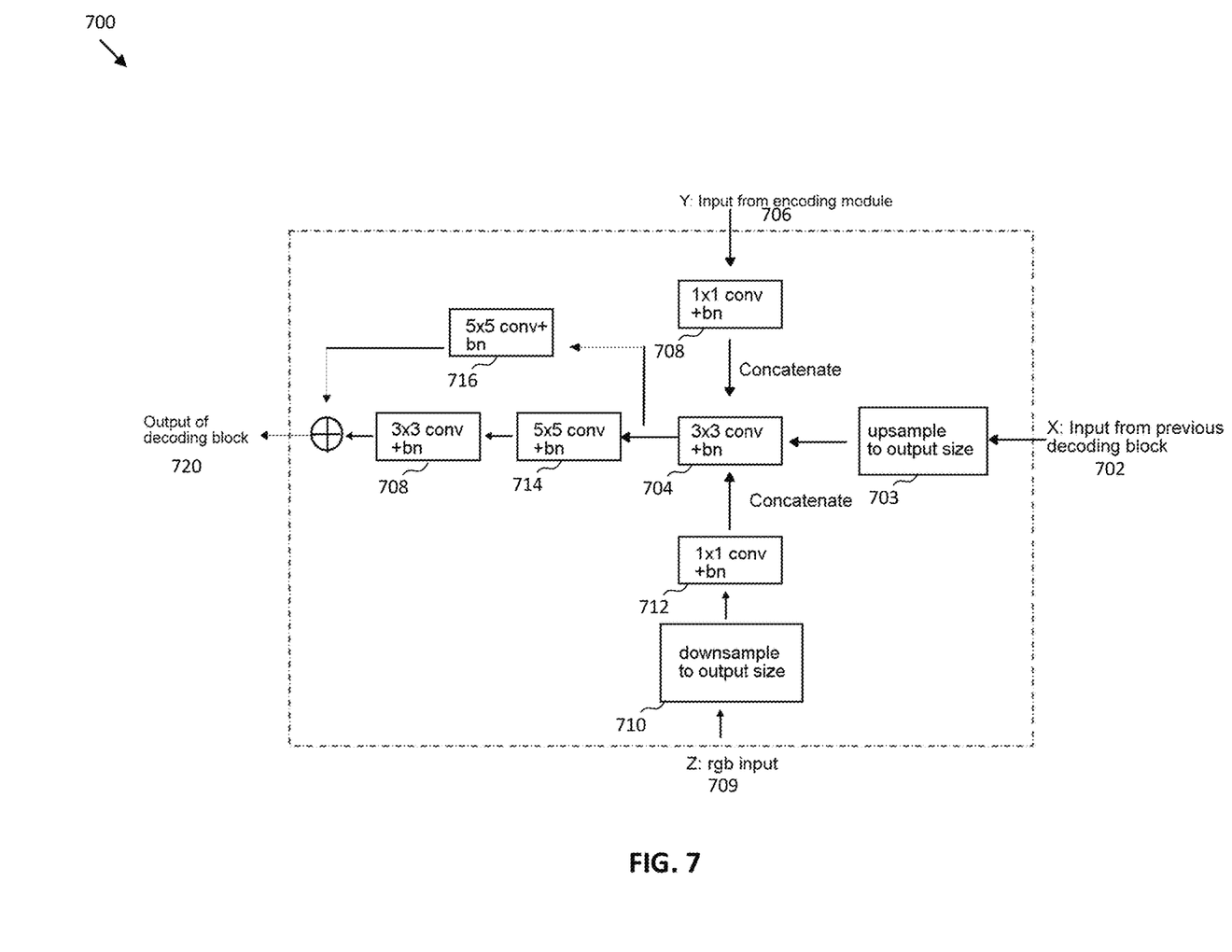
FIG. 7 illustrates a diagram of an upproj layer with skip connections, according to an embodiment.

FIG. 7 illustrates a diagram of an upproj layer with skip connections, according to an embodiment. An upproj layer 700 receives an X input 702 from a previous decoding block. The X input 702 is upsampled to output size 703 and then processed by a 3×3 convolutional layer 704. The layer 700 receives a Y input 706 from an encoding model that is processed by a 1×1 convolutional layer 708 and is concatenated at the 3×3 convolutional layer 704. The layer 700 receives a Z RGB input 709. The input 709 is downsampled to output size at 710, processed by a 1×1 convolutional layer 712 and concatenated at the 3×3 convolutional layer 704. The output of the 3×3 convolutional layer 704 is processed by a first 5×5 convolutional layer 714 and a second 5×5 convolutional layer 716. The output of the first 5×5 convolutional layer 714 is processed by a 3×3 convolutional layer 718, the output of which is combined with the output of the layer 716, producing the output 720 of the decoding block.

In the network 500, decoding block 528 and decoding block 538 utilize the upproj layer 600. Decoding blocks 520, 522, 524 and 526, as well as decoding blocks 530, 532, 534 and 536 utilize the upproj layer 700 with skip connections.

In examples where the system uses coarse depth estimation for classifying the image into a depth range, the coarse depth map generated during coarse depth estimation may be utilized as an input for the SIDE network, and different SIDE networks may be used as a result.

Figure 8:
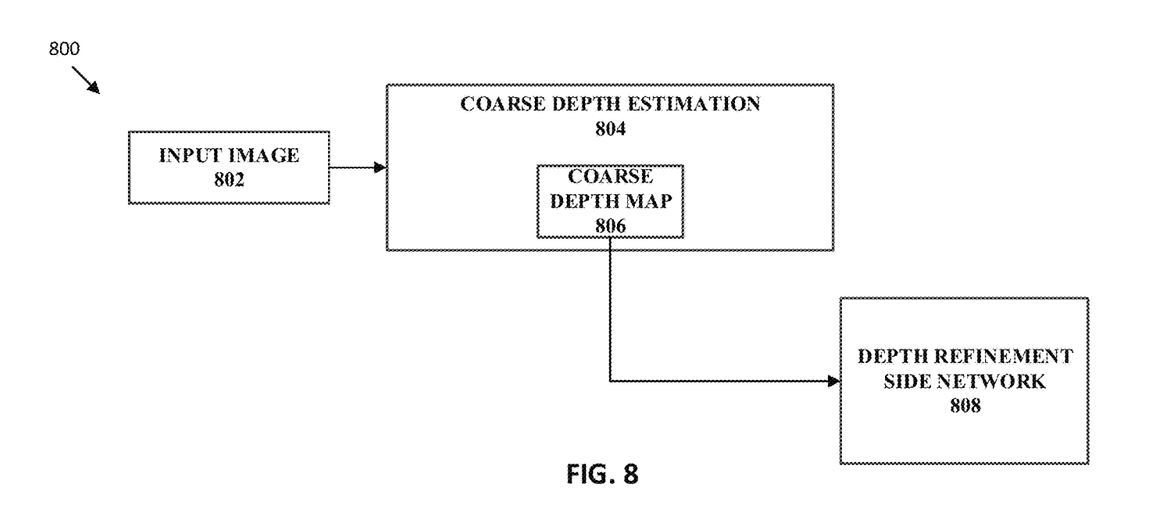
FIG. 8 illustrates a diagram of depth estimation using a depth refinement SIDE network, according to an embodiment.

FIG. 8 illustrates a diagram providing depth estimation using a depth refinement SIDE network, according to an embodiment. A depth estimation system 800 receives an input image 802 and classifies the image into a depth range using coarse depth estimation 804. The system then uses the coarse depth map 806 generated from this step for depth refinement depth estimation with the SIDE network 808.

Figure 9:
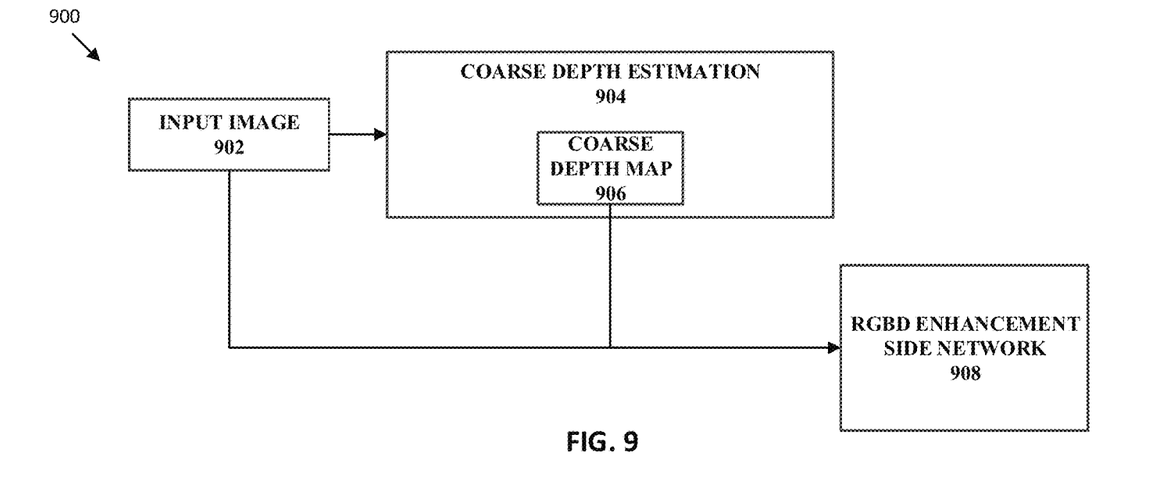
FIG. 9 illustrates a diagram of depth estimation using an RGB-depth (RGBD) enhancement SIDE network, according to an embodiment.

FIG. 9 illustrates a diagram providing depth estimation using an RGB-depth (RGBD) enhancement SIDE network, according to an embodiment. A depth estimation system 900 receives an input image 902 and classifies the image into a depth range using coarse depth estimation 904. The system then uses the coarse depth map 906 generated from this step, as well as the input image 902 for RGBD enhancement depth estimation with the SIDE network 908. The D channel in the RGBD enhancement may use a dense RGB image but sparse sampling pixels from coarse depth map or a dense RGB image as well as all the pixels from the coarse depth map.

Figure 10:
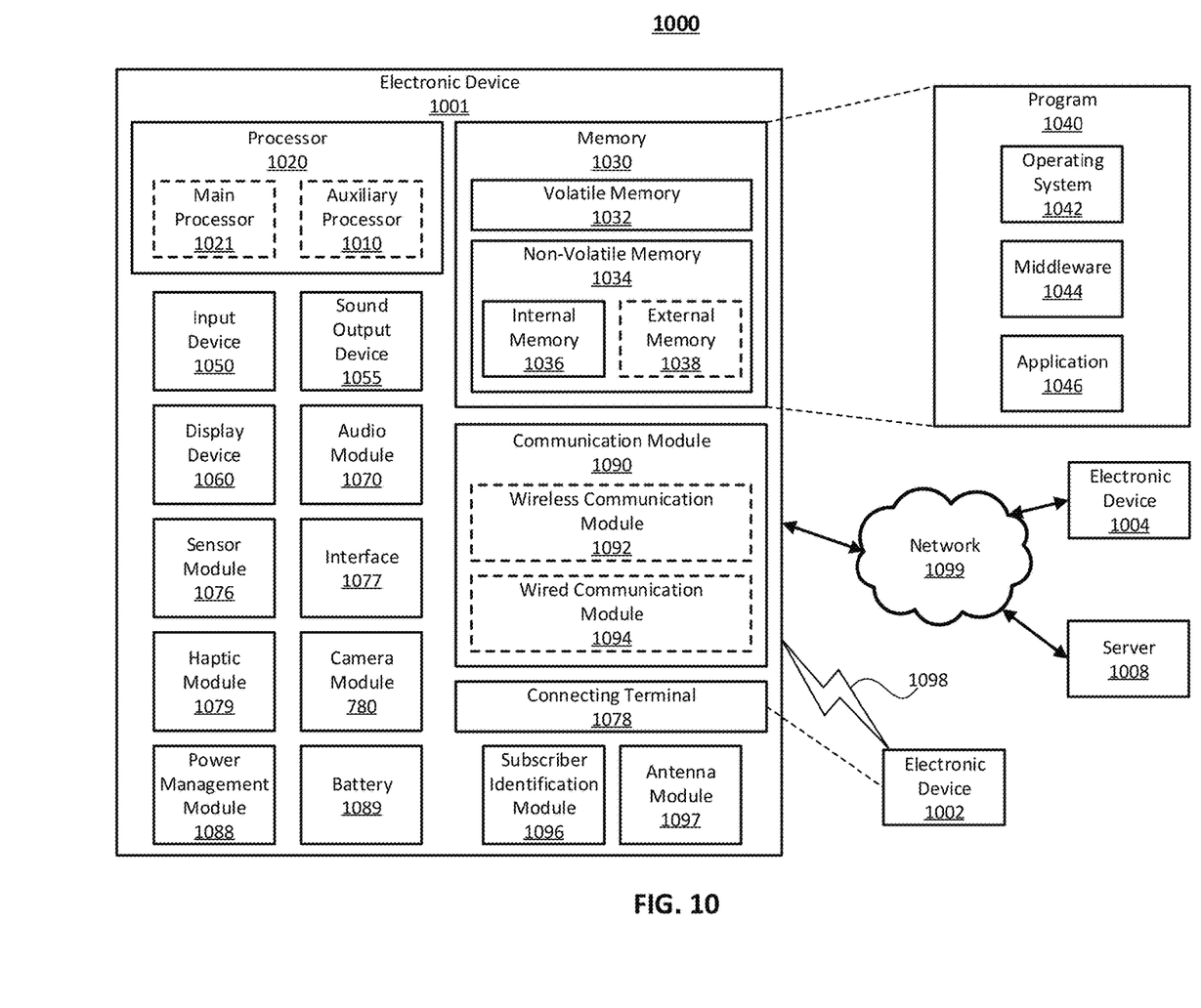
FIG. 10 illustrates a block diagram of an electronic device in a network environment, according to one embodiment.

FIG. 10 illustrates a block diagram of an electronic device 1001 in a network environment 1000, according to one embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In one embodiment, at least one (e.g., the display device 1060 or the camera module 1080) of the components may be omitted from the electronic device 1001, or one or more other components may be added to the electronic device 1001. In one embodiment, some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to one embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to one embodiment, the audio module 1070 may obtain the sound via the input device 1050, or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. According to one embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. According to one embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. According to one embodiment, the haptic module 1079 may include, for example, a motor, a piezoelectric element, or an electrical stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. According to one embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. According to one embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to one embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for determining depth information of an image, comprising:
   receiving an image input;
   classifying, using a first network, the input image into a first depth range of a plurality of candidate depth ranges that comprises the first depth range and a second depth range different from the first depth range;
   selecting, responsive to classifying the input image into the first depth range, from a plurality of candidate networks that includes (i) a second network optimized to obtain depth maps for the first depth range and (ii) a third network optimized to obtain depth maps for the second depth range, the second network; and
   determining a depth map of the input image by applying the second network.

2. The method of claim 1, wherein classifying the input image is performed based on coarse depth estimation.

3. The method of claim 2, wherein determining the depth map of the image by applying the second network further comprises utilizing a coarse depth map generated by the course depth estimation as an input for a depth refinement single image depth estimation (SIDE) network.

4. The method of claim 3, wherein determining the depth map of the image by applying the second network further comprises utilizing the coarse depth map and the input image as an RGB-depth (RGBD) input for an RGBD enhancement SIDE network.

5. The method of claim 2, wherein the coarse depth estimation is performed by calculating a maximum depth of the input image and comparing the maximum depth with a depth range threshold.

6. The method of claim 1, wherein classifying the input image includes classifying the input image into a predefined scene.

7. The method of claim 6, wherein classifying the input image into a predefined scene is performed based on majority voting.

8. The method of claim 6, wherein classifying the input image into a predefined scene is performed based on weighted voting.

9. The method of claim 1, wherein determining the depth map of the image by applying the second network further comprises:
   encoding, with a single image depth estimation (SIDE) network, the input image; and
   decoding, with the SIDE network, the input image with a depth regression decoding branch.

10. The method of claim 1, wherein determining the depth map of the image by applying the second network further comprises:
    encoding, with a single image depth estimation (SIDE) network, the input image; and
    decoding, with the SIDE network, the input image with a depth classification decoding branch.

11. A system for determining depth information of an image, comprising:
    a memory; and
    a processor configured to:
      receive an image input;

classify, using a first network, the input image into a first depth range of a plurality of candidate depth ranges that comprises the first depth range and a second depth range different from the first depth range;

select, responsive to classifying the input image into the first depth range, from a plurality of candidate networks that includes (i) a second network optimized to obtain depth maps for the first depth range and (ii) a third network optimized to obtain depth maps for the second depth range, the second network; and determine a depth map of the image by applying the second network.

12. The system of claim 11, wherein the processor is configured to classify the input image based on coarse depth estimation.

13. The system of claim 12, wherein the processor is configured to determine the depth map of the image by applying the second network by utilizing a coarse depth map generated by the course depth estimation as an input for a depth refinement single image depth estimation (SIDE) network.

14. The system of claim 13, wherein the processor is further configured to determine the depth map of the image by applying the second network by utilizing the coarse depth map and the input image as an RGB-depth (RGBD) input for an RGBD enhancement SIDE network.

15. The system of claim 12, wherein the coarse depth estimation is performed by calculating a maximum depth of the input image and comparing the maximum depth with a depth range threshold.

16. The system of claim 11, wherein the processor is configured to classify the input image by classifying the input image into a predefined scene.

17. The system of claim 16, wherein classifying the input image into a predefined scene is performed based on majority voting.

18. The system of claim 16, wherein classifying the input image into a predefined scene is performed based on weighted voting.

19. The system of claim 11, wherein the processor is configured to determine the depth map of the image by applying the second network by:

encoding, with a single image depth estimation (SIDE) network, the input image; and decoding, with the SIDE network, the input image with a depth regression decoding branch.

20. The system of claim 11, wherein the processor is configured to determine the depth map of the image by applying the second network by:

encoding, with a single image depth estimation (SIDE) network, the input image; and decoding, with the SIDE network, the input image with a depth classification decoding branch.

* * * * *